United States Patent
Miller et al.

(10) Patent No.: US 8,203,325 B2
(45) Date of Patent: Jun. 19, 2012

(54) ACTIVATION SYSTEMS AND METHODS TO INITIATE HDMI COMMUNICATION WITH MOBILE SOURCES

(75) Inventors: Rodney Dean Miller, Kernersville, NC (US); Charles O'Roark, Oak Ridge, NC (US); Ralph Moore, Greensboro, NC (US); George F. Diniz, Liberty, NC (US)

(73) Assignee: Analog Devices, Inc., Norwood, MA (US)

( * ) Notice: Subject to any disclaimer, the term of this patent is extended or adjusted under 35 U.S.C. 154(b) by 835 days.

(21) Appl. No.: 12/231,773

(22) Filed: Sep. 5, 2008

(65) Prior Publication Data
US 2009/0083825 A1 Mar. 26, 2009

Related U.S. Application Data

(60) Provisional application No. 60/967,890, filed on Sep. 7, 2007.

(51) Int. Cl.
*G01R 19/00* (2006.01)
*G01R 27/26* (2006.01)

(52) U.S. Cl. .......................................... 324/66; 324/672

(58) Field of Classification Search .................. 324/66, 324/672
See application file for complete search history.

(56) References Cited

U.S. PATENT DOCUMENTS

| | | | | |
|---|---|---|---|---|
| 5,559,427 A | * | 9/1996 | Hinds et al. | 324/66 |
| 5,629,628 A | * | 5/1997 | Hinds et al. | 324/628 |
| 5,649,001 A | * | 7/1997 | Thomas et al. | 379/93.07 |
| 6,462,435 B1 | * | 10/2002 | Covaro et al. | 307/89 |
| 6,600,727 B1 | * | 7/2003 | Mackay | 370/293 |
| 6,973,230 B1 | * | 12/2005 | Mackay | 385/24 |
| 6,986,681 B2 | | 1/2006 | Tsai | 439/607 |
| 7,059,914 B2 | | 6/2006 | Tsai | 439/660 |
| 7,074,088 B1 | | 7/2006 | Tsai | 439/610 |
| 7,175,465 B1 | | 2/2007 | Tsai | 439/352 |
| 7,207,836 B2 | | 4/2007 | Tsai | 439/541.5 |

(Continued)

FOREIGN PATENT DOCUMENTS
JP 2003044182 A 2/2003
(Continued)

OTHER PUBLICATIONS

PCT Notification of the International Search Report and the Written Opinion of the International Searching Authority, Dated Dec. 12, 2008; for International Application No. PCT/US2008/010521.

(Continued)

*Primary Examiner* — Timothy J Dole
(74) *Attorney, Agent, or Firm* — Koppel, Patrick, Heybl & Philpott

(57) ABSTRACT

Activation systems and methods initiate High-Definition Multimedia Interface (HDMI) communication between an HDMI source and an HDMI sink through an HDMI receptacle of the source. These systems and methods are especially suited for use with mobile sources that generally operate from a battery that cannot provide the +5V signal which the HDMI protocol requires sources to place on the +5V pin of their HDMI receptacles. These systems and methods automatically detect the insertion of an HDMI cable into the source's HDMI receptacle and subsequently generate and apply the required +5V signal to the +5V pin of the source's HDMI receptacle to initiate HDMI communication. Because they are directed to use in mobile sources, the embodiments are configured to minimize current drain.

14 Claims, 4 Drawing Sheets

U.S. PATENT DOCUMENTS

| | | | |
|---|---|---|---|
| 7,210,945 B1 | 5/2007 | Ying | 439/79 |
| 7,252,548 B2 | 8/2007 | Huang | 439/607 |
| 7,341,487 B2 | 3/2008 | Wu | 439/607 |
| 7,374,454 B1 | 5/2008 | Wang | 439/536 |
| 7,387,542 B1 | 6/2008 | Kero | 439/660 |
| 7,523,241 B2* | 4/2009 | Konishi | 710/302 |
| 7,880,474 B1* | 2/2011 | Mackay | 324/539 |
| 7,902,810 B2* | 3/2011 | Naylor et al. | 324/66 |
| 2004/0249991 A1 | 12/2004 | Ali et al. | |
| 2006/0109729 A1 | 5/2006 | Yaoi et al. | |
| 2006/0252184 A1 | 11/2006 | Tabira et al. | |
| 2008/0084834 A1* | 4/2008 | Stanek | 370/284 |

FOREIGN PATENT DOCUMENTS

JP     2006146780 A     6/2006

OTHER PUBLICATIONS

Torres, Gabriel, "Inside HDMI (High Definition Mulitmedia Interface", Feb. 2006.

Brandlow, Joanne, "HDMI Utah Tech Info", May 1, 2007, pp. 1-8.

La Maestra, Rodolfo, "Digital Connectivity—A Tutorial", Apr. 25, 2006, pp. 1-4.

* cited by examiner

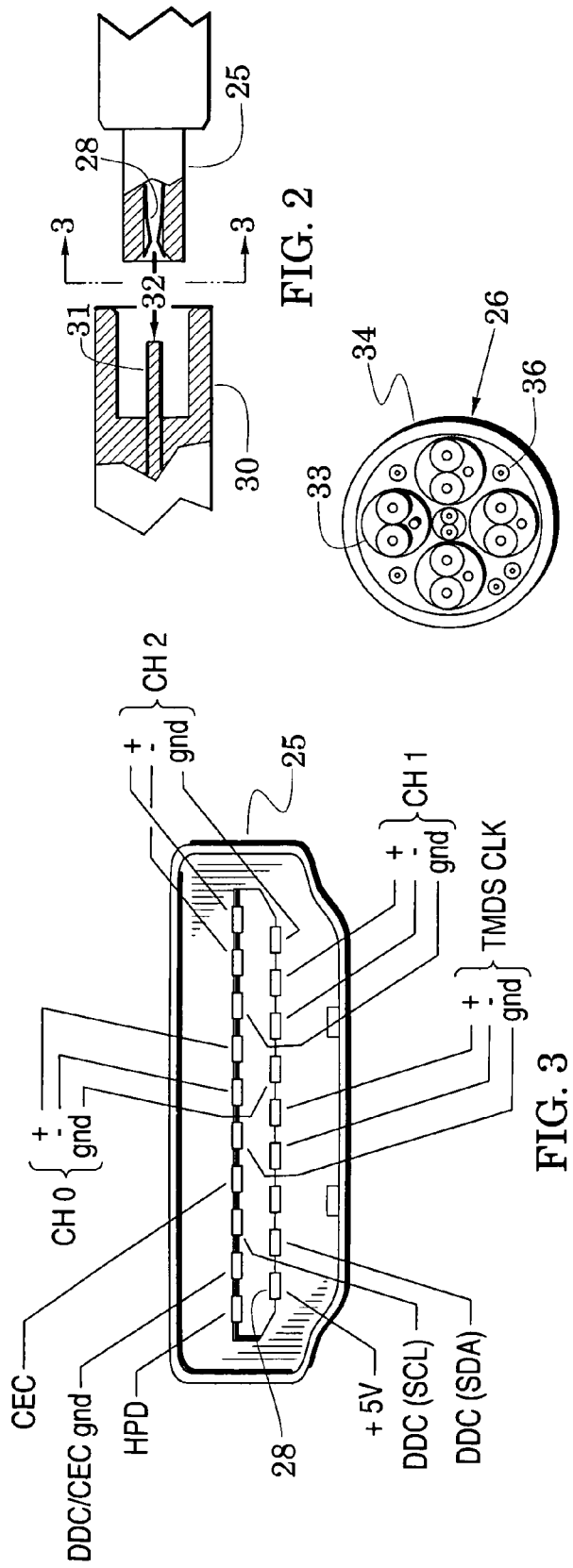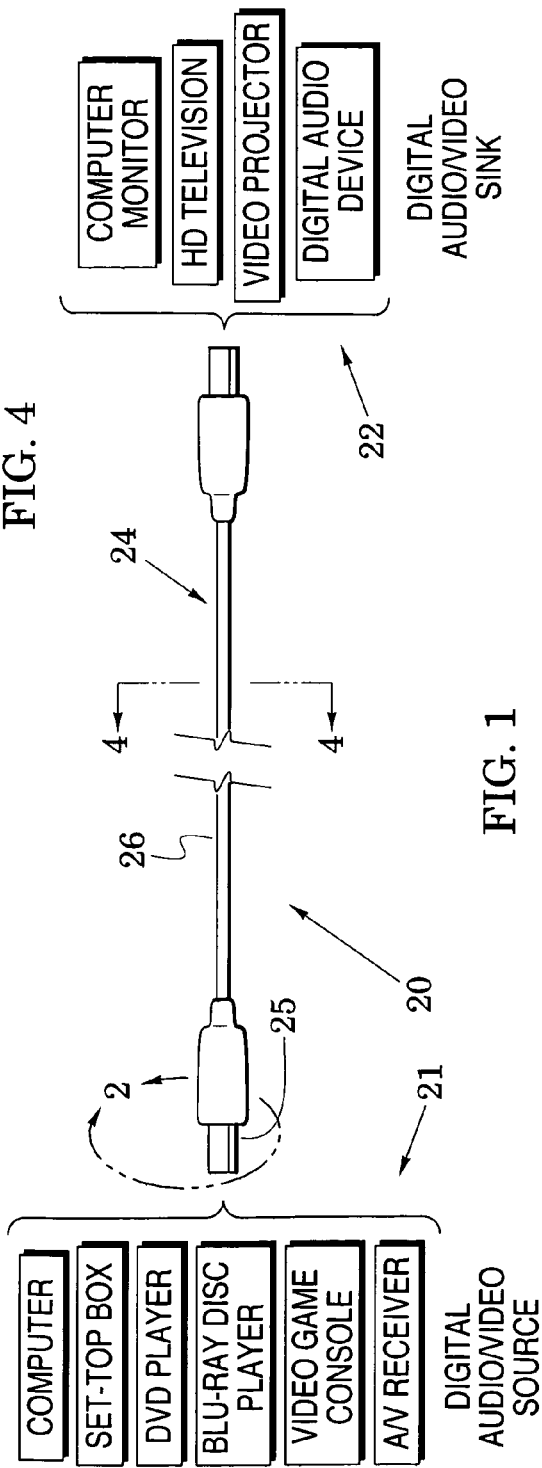

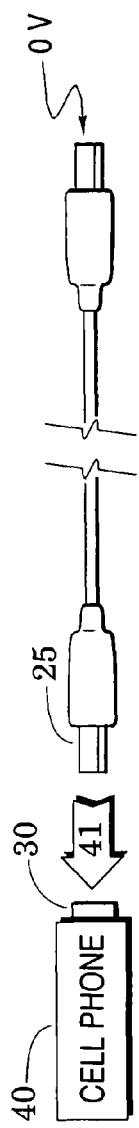

FIG. 5A

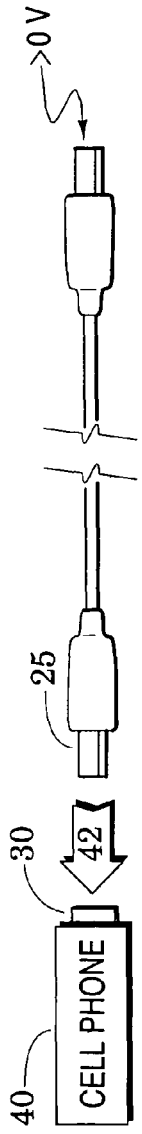

FIG. 5B

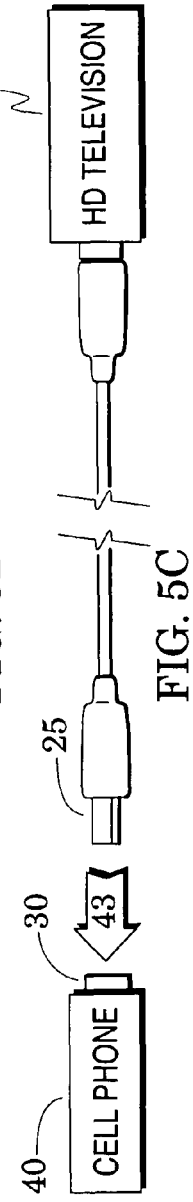

FIG. 5C

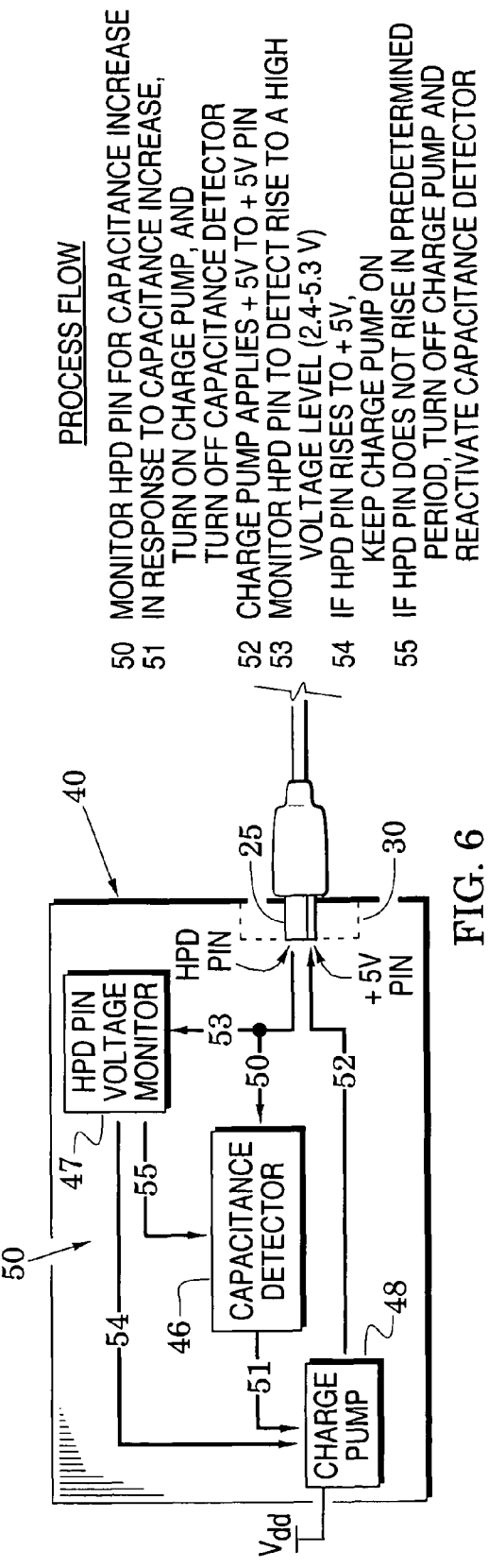

FIG. 6

PROCESS FLOW

50  MONITOR HPD PIN FOR CAPACITANCE INCREASE
51  IN RESPONSE TO CAPACITANCE INCREASE, TURN ON CHARGE PUMP, AND TURN OFF CAPACITANCE DETECTOR
52  CHARGE PUMP APPLIES +5V TO +5V PIN
53  MONITOR HPD PIN TO DETECT RISE TO A HIGH VOLTAGE LEVEL (2.4-5.3 V)
54  IF HPD PIN RISES TO +5V, KEEP CHARGE PUMP ON
55  IF HPD PIN DOES NOT RISE IN PREDETERMINED PERIOD, TURN OFF CHARGE PUMP AND REACTIVATE CAPACITANCE DETECTOR

ACTIVATION SYSTEMS AND METHODS TO INITIATE HDMI COMMUNICATION WITH MOBILE SOURCES

CROSS REFERENCES TO RELATED APPLICATIONS

This application claims the benefit of U.S. Provisional Application Ser. No. 60/967,890 filed Sep. 7, 2007.

BACKGROUND OF THE INVENTION

1. Field of the Invention

The present invention relates generally to High-Definition Multimedia Interface systems.

2. Description of the Related Art

High-Definition Multimedia Interface (HDMI) is a compact audio-video connector interface directed to transmittal of uncompressed digital data streams. On a single cable, HDMI supports television (TV) and personal computer (PC) video formats including standard, enhanced and high-definition video along with up to 8 channels of digital audio. Development of HDMI 1.0 began in early 2002 under direction of the HDMI founders (Hitachi, Matsushita Electric Industrial (Panasonic), Phillips, Silicon Image, Sony, Thomson (RCA), and Toshiba). The HDMI specification has been adopted by over 800 consumer electronics (CE) and PC companies and HDMI products generally began shipping in autumn of 2003.

HDMI devices are manufactured to adhere to various specification versions in which each version has an assigned number such as 1.0, 1.2, or 1.3a. The HDMI 1.3 specification defines category 1 cables which have been tested at a pixel clock rate of 74.5 MHz and category 2 cables which have been tested at a pixel clock rate of 340 MHz to meet a set of required parameter specifications (inter-pair skew, far-end crosstalk, attenuation, differential impedance) or, alternatively, to meet non-equalized/equalized eye diagram requirements. HDMI cables that are manufactured with lower-quality construction and materials can generally meet the HDMI performance requirements at distances up to something on the order of 5 meters whereas higher-quality cables can generally meet the requirements at distances up to something on the order of 15 meters.

Currently, there are three HDMI connector types. The type A connector has outer dimensions of 4.45×13.9 millimeters and provides 19 pins with bandwidth to support current high-definition television (HDTV) modes. The type B connector has outer dimensions of 4.45×21.2 millimeters and provides 29 pins to double the bandwidth of type A to thereby support future high-resolution displays. A type C mini-connector is also provided to support mobile devices.

HDMI facilitates exchange of video, audio and auxiliary data in three modes called the Video Data Period, the Data Island Period and the Control Period. Pixels of an active video line are transmitted during the Video Data Period. During the Data Island Period (which occurs during horizontal and vertical blanking intervals), audio and auxiliary data pixels are transmitted. The Control Period is positioned between these two periods.

One objective of the HDMI protocol is to reduce several conventional cables that traditionally interconnect a digital source (i.e., a source of digital video and/or audio signals) and a digital sink (i.e., a device that responds to the digital video and/or audio signals) down to a single cable. HDMI was developed for consumer electronics products and it thus contrasts with an earlier protocol digital video interface (DVI) that was developed for use by computers. DVI also provides digital connection between sources and sinks but it doesn't carry audio signals which implies that an extra cable is required for an audio connection. HDMI, however, is fully backward compatible with DVI so that that only a DVI-to-HDMI cable adaptor is required for use with a DVI system. This opens HDMI to a wide range of DVI-equipped products from a variety of manufacturers. In contrast to DVI, HDMI facilitates higher resolutions, connects both video and audio signals, supports two-way communication between source and sink, and its connectors are significantly smaller.

Similar to DVI, HDMI transports data via the transition minimized differential signaling (TMDS) encoding protocol. TMDS conveys data by transitioning between '1' and '0' states while, at the same time, minimizing the state transitions. Reducing the state transitions substantially reduces electromagnetic interference (EMI) levels on the HDMI cable. In addition, however, TMDS acts to minimize long strings of identical states which otherwise can cause detection errors. In this process, incoming 8-bit data is encoded into a 10-bit transition-minimized, DC-balanced word. Three TMDS data channels (CH0, CH1 and CH2) are provided in an HDMI cable with each channel consisting of a signal conductor, an inverse signal conductor, and a ground conductor. A fourth channel (also comprising signal conductor, inverse signal conductor and ground) is dedicated to carry a TMDS clock signal.

Another cable conductor is dedicated to consumer electronic control (CEC) which allows a system user to command and control multiple CEC-enabled devices with one remote control and for individual CEC-enabled devices to command and control each other without user intervention. CEC has the capability of turning all remote controls in a system into universal remotes so that, for example, a single button can switch on all devices that are needed to play back content. In an exemplary scenario, a DVD player could turn on a sink device and associated surround sound systems that are needed for playback.

Other cable conductors are directed to display data channel (DDC) which allows a source device (e.g., a DVD player) to determine the audio and visual capabilities of a sink device. A DDC query from the source device prompts the display to respond with associated display and interface information (e.g., manufacturer name, model number, acceptable data formats, and other display capabilities. DDC can, for example, automatically manage a display device so that a consumer need not alter settings to obtain the highest quality output. DDC is realized with a data conductor (SDA) and a clock conductor (SCL). A ground for both CEC and DDC is carried on a separate conductor. After successful completion of these DDC communications, the sink device can be enabled to receive clock and TMDS signals from the source device.

In order to facilitate DDC communications, another cable connector, called hot plug direct (HPD), permits the source device to detect when a sink device has been connected to it. When an HDMI cable is mounted to the sink device, this device detects that the source device is providing +5 V on the +5V conductor. In response, the sink device places a high level voltage on the HPD conductor. When the source device detects this signal on its HPD conductor, it then inaugurates the DDC communication.

BRIEF SUMMARY OF THE INVENTION

The present invention is generally directed to activation systems and methods for initiating HDMI communication with mobile devices. The drawings and the following description provide an enabling disclosure and the appended claims particularly point out and distinctly claim disclosed subject matter and equivalents thereof.

BRIEF DESCRIPTION OF THE DRAWINGS

FIG. 1 is a view of an HDMI cable connecting exemplary HDMI sources and sinks;

FIG. 2 is an enlarged view of an HDMI plug within the ellipse 2-2 which shows its insertion into an HDMI receptacle;

FIG. 3 is a view along the plane 3-3 of FIG. 2 which illustrates layout of HDMI pins in the HDMI plug;

FIG. 4 is a view along the plane 4-4 of FIG. 1 which illustrates conductors inside an HDMI cord;

FIGS. 5A-5C illustrate various insertions of an HDMI cable into the receptacle of a mobile HDMI source;

FIG. 6 is a diagram that illustrates structure and processes of an HDMI activation system embodiment;

DETAILED DESCRIPTION OF THE INVENTION

Figure 7B:
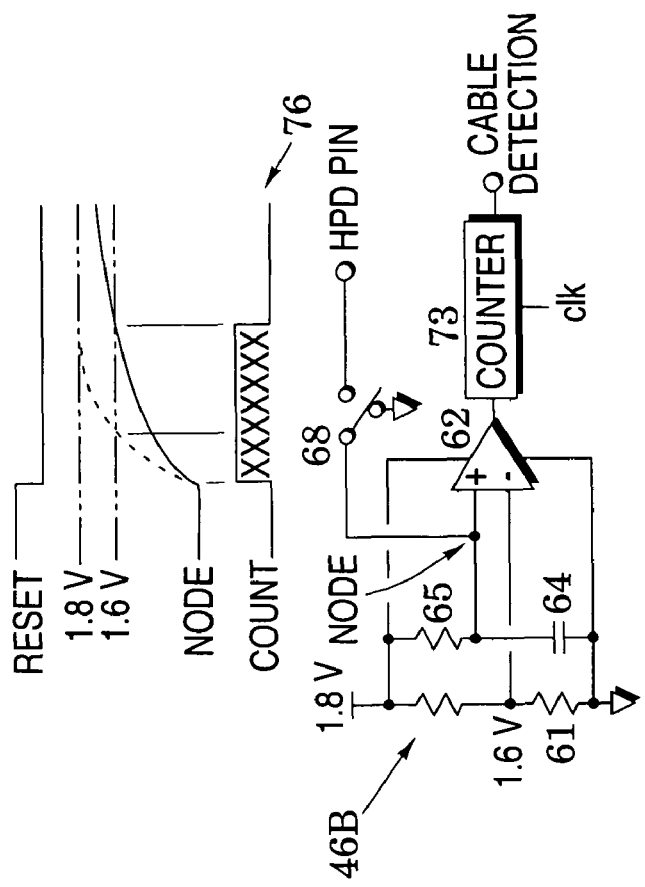
FIGS. 7A and 7B are schematics of capacitor detector embodiments for use in the system of FIG. 6.

FIGS. 1-8B illustrate activation system embodiments that are configured to initiate HDMI communication between an HDMI source and an HDMI sink through an HDMI receptacle of the source. These systems and methods are especially suited for use with mobile sources that generally operate with a supply voltage that is less than the +5V signal which the HDMI protocol requires sources to place on the +5V pin of their HDMI receptacles. Accordingly, HDMI communication will not be initiated when the mobile source is connected to an HDMI sink. However, the activation embodiments illustrated in FIGS. 1-8B will automatically detect the insertion of an HDMI cable into the source's HDMI receptacle and will subsequently generate and apply the required +5V signal to the +5V pin of the source's HDMI receptacle to initiate HDMI communication. Because these embodiments are directed to use in mobile sources, they are configured to minimize current drain.

In particular, FIG. 1 illustrates HDMI systems 20 in which any of various digital audio/video sources 21 can be coupled to any of various digital audio/video sinks 22 through an HDMI cable 24 that is formed with two HDMI plugs 25 that are joined together by an HDMI cord 26. As shown, examples of the sources 21 are computers, set-top boxes, digital video disc (DVD) players, Blu-ray disc players, video game consoles, and audio/video (A/V) receivers. As also shown, examples of the sinks 22 are computer monitors, high definition (HD) televisions, video projectors, and digital audio devices.

FIG. 2 is an enlarged view of the HDMI plug 25 within the ellipse 2-2 of FIG. 1. This enlarged view is also partially sectioned to illustrate that the plug has spring-like conductive pins 28 arranged at top and bottom of a socket. FIG. 2 also shows an HDMI receptacle 30 which carries conductive spikes 31 on top and bottom of a tongue located within a recess. An insertion arrow 32 illustrates insertion of the plug 25 into the recess which will insert the receptacle's tongue into the plug's socket with each of the spikes 31 contacting a respective one of the pins 28. For simplicity of description, all of the pins 28 and spikes 31 will, from this point on, be simply referred to as pins.

FIG. 3 is a view along the plane 3-3 in FIG. 2 that illustrates the layout of HDMI pins 28 within the recess of the HDMI plug 25 of FIG. 2. The layout corresponds with the 19 pin layout of both type A and type C HDMI plugs. Each of the three data channels (channels 0, 1 and 2) and the associated TMDS clock is formed by a signal pin (denoted as +), an inverse signal pin (denoted as −), and a ground pin. These pins are located at the center and the right side of the plug 25. CEC, DDC data and clock, HPD, +5V, and DDC/CEC ground are each carried on respective pins that are located at the left side of the plug 25.

FIG. 4, which is an enlarged view along the plane 4-4 in FIG. 1, shows that the signal, inverse signal, and ground of each of the data channels and the TMDS clock is bundled within its own foil (e.g., mylar) wrap 33. The wraps, in turn, are carried within a cord jacket 34. FIG. 4 also shows that SDA and SDC portions of the DDC are carried within another foil wrap in the center of the cord 26 and the other HDMI signals 36 (CEC, hotplug direct, +5V, DDC/CEC ground and a spare) are spaced about the interior of the cable.

In a particular embodiment, FIG. 1 indicates that a digital audio/video source such as a DVD player may be connected through an HDMI cable 24 to a digital audio/video source such as a HD television. In a typical connection scenario, both the DVD player and the HD television would normally be plugged into an electrical energizing source prior to application of the HDMI cable. Accordingly, they can generate various internal voltages and have them available for use. One of these voltages can be +5 volts so that, in accordance with the HDMI protocol, the DVD player can place +5 volts on its +5V pin of the HDMI cable (the +5 volts is specified in the HDMI protocol to be between 4.8 and 5.3 volts with a maximum current capability of 50 milliamps).

When the HDMI cable is inserted between the devices, the HD television monitors its +5V pin (and, in accordance with the HDMI protocol, pulls less than 10 milliamps from this pin). If +5V is not detected, the HD television is required by the HDMI protocol to place a low voltage level between 0 and 0.4 volts on its HPD pin (e.g., via a resistor coupled to ground). If +5V is detected, the HD television is required to place a high voltage level between 2.4 and 5.3 volts on its HPD pin. When the DVD player detects the high voltage level on its HPD pin, it can then initiate the DDC communication process described above in the background section. After successful completion of these DDC processes, the HD television device can then receive clock and TMDS signals from the DVD player over the clock pins and the channel 0, 1 and 2 pins that are shown in FIG. 3. These signals enable the HD television to generate video and audio signals.

In contrast to sources such as the DVD player, mobile sources typically operate on battery voltages in the range of 2.5 to 4.5 volts and are thus unable to provide a voltage on the +5V line of the HDMI plug 28 that will be recognized by a sink device. FIG. 6, however, illustrates an automatic activation system embodiment 50 that can modify a mobile source to address this problem. Before describing the system 50, attention is directed to FIGS. 5A-5C which illustrate possible couplings of an HDMI cable to a mobile source in the form of a cell phone 40. In FIG. 5A, an insertion arrow 41 indicates that an HDMI cable with pin potentials of zero volts is inserted into the HDMI receptacle 30 of the cell phone 40. In FIG. 5B, an insertion arrow 42 indicates that an HDMI cable with pin potentials greater than zero volts (i.e., the pins carry a charge) is inserted into the receptacle 30. Finally, an insertion arrow 43 in FIG. 5C indicates that an HDMI cable has a sink device such as an HD television 44 attached and the cable is inserted into the receptacle 30.

Attention is now returned to FIG. 6 which shows the activation system 50 installed in a mobile source in the form of the cell phone 40 of FIGS. 5A-5C. The system 50 includes a capacitance detector 46, an HPD pin voltage monitor 47, and a charge pump 48. The capacitance detector and the HPD pin voltage monitor are coupled to the HPD pin of an HDMI receptacle 30 of the cell phone 40 and the charge pump 48 is coupled to the +5V pin of the receptacle 30.

Because the cell phone 40 operates on a battery voltage in the range of 2.5 to 4.5 volts, it cannot provide a voltage on the +5V line of the HDMI plug 28 that will be recognized by a sink. The activation system 50 of FIG. 5, however, modifies the cell phone so that it can successfully complete HDMI communications with an HDMI sink. Operational processes of this automatic activation system are shown as processes 50 through 55 in the cell phone 40 and these processes are briefly described under the heading "process flow" in FIG. 6.

In an initial process 50, the capacitance detector 46 monitors the HPD pin to detect an increase in capacitance at this pin. During this monitoring process, the charge pump 48 is not activated to thereby reduce current drain from the battery of the cell phone. In process 51, the capacitance detector responds to a recognized capacitance increase by turning on the charge pump 48 as indicated by process 51. As it is no longer needed, the capacitance detector is preferably turned off to also reduce current drain. The charge pump now generates a +5 volt signal and applies it to the +5V pin as indicated by process 52 and as required by the HDMI protocol.

Because the capacitance detector 46 is configured to sense an added capacitance, it can sense any of the insertions 41-43 illustrated in FIGS. 5A-5C because it detects the inserted capacitance formed by the HPD line through the HDMI cord (26 in FIGS. 1 and 4) and the HDMI pins at each end of this line. At this point, the system 50 has established that one of these insertions has taken place. To determine if an HDMI sink is at the other end of the inserted HDMI cable, the voltage monitor 47 now monitors the HPD pin to detect a rise to the high voltage level between 2.4 and 5.3 volts which is the signal that a sink places on the HPD pin in response to the +5 volts that it senses on the +5V pin. This is indicated in FIG. 6 as process 53.

If the voltage monitor 47 observes that the HPD pin is at the high voltage level, the system 50 knows an HDMI sink is present and, accordingly, process 54 keeps the charge pump enabled to maintain contact with the sink. The cell phone 40 then inaugurates the DDC communications described above in the background section. After successful completion of these DDC communications, the sink device can be enabled to receive clock and TMDS signals from the cell phone over the clock pins and the channel 0, 1 and 2 pins shown in FIG. 2.

If, however, the voltage monitor 47 observes that the HPD pin does not rise to the high voltage level within a predetermined time (i.e., it remains at the low voltage level between 0 and 0.4 volts), then it is known that an HDMI sink is not present and process 55 turns off the charge pump 48 and reactivates the capacitance detector 46. The system 50 is now returned to a state in which it minimizes current drain while it continues to sense insertion of an added capacitance. Although the capacitance detector 46 is coupled in FIG. 6 to detect inserted capacitance at the HPD pin of the receptacle 30, it is noted that it may be coupled to detect inserted capacitance at other pins in other activation system embodiments.

Figure 7A:
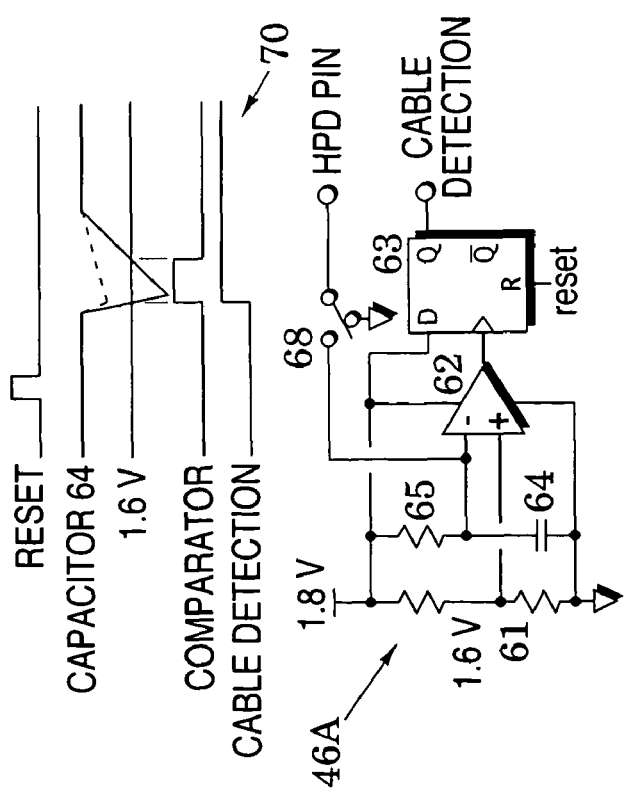

FIG. 7A illustrates an embodiment 46A of the capacitance detector 46 of FIG. 6. This embodiment includes a resistive voltage divider 61, a comparator 62, and a flip-flop 63. The voltage divider is coupled to one input port of the comparator. A capacitor 64 is coupled to the other comparator input port with a resistor 65 coupled between the capacitor and an exemplary source supply voltage of 1.8 V. A switch 68 grounds the HPD pin (shown in FIG. 5) and then momentarily couples the HPD pin to the capacitor 64. The output of the comparator is coupled to a flip-flop 63 whose output forms a cable detection signal.

FIG. 7A also shows a reset signal that resets the flip-flop 63 and momentarily sets the switch 68 to ground to thereby discharge any voltage at the HPD pin (e.g., voltage indicated on the HDMI cable in FIG. 5B). As long as the switch 68 is set to ground, the capacitor 64 is charged to 1.8V and thus holds an electric charge Q of $1.8/C_{64}$. When the switch 68 couples the HPD pin to the capacitor 64, the total capacitance increases but the charge instantaneously remains the same. Because a charge Q in a capacitance C generates a voltage V and because C has suddenly increased, the voltage must decrease.

If no HDMI cable is attached to the HPDI pin, the added capacitance is quite small so that the voltage decrease is also quite small as indicated by the broken-line path for "capacitor 64" in FIG. 7A. This broken-line path does not drop below the 1.6V reference of the resistive voltage divider 61 so that the comparator 62 does not change state. If, however, the increase in capacitance is substantial because an HDMI cable is attached to the HDMI pin (e.g., as in FIGS. 4A-4C), the voltage will momentarily drop below the 1.6V reference and the output of the comparator 62 goes high as indicated in the "comparator" plot of FIG. 7A. In response to the comparator, the flip-flop 63 provides a cable detection signal. Accordingly, the process 51 of FIG. 6 causes the charge pump 48 to be turned on and the capacitance detector 46 to be turned off (to thereby reduce current drain).

It is noted that, in the embodiment 46A, the resistor 65 provides a charging current to the capacitor 64 and the comparator 62 is coupled to sense a predetermined voltage drop across the capacitor when the HPD pin is coupled to the capacitor after the capacitor has been charged. The predetermined voltage drop thus indicates presence of the HDMI cable.

FIG. 7B illustrates an embodiment 46B of the capacitance detector 46 of FIG. 6. This embodiment includes elements of the embodiment 46A of FIG. 7A with like elements indicated by like reference numbers. In the embodiment 46B, however, the comparator inputs are interchanged, the switch 68 is flipped horizontally, and the flip-flop 63 is replaced with a counter 73. When the switch 68 is grounded, it resets the charge in the capacitor 64 to zero. When the switch couples the HPD pin to the "node", the voltage at this node rises. If the only capacitance present is that of the capacitor 64, the node voltage rises rapidly to 1.8V as indicated by the broken line in the node plot. If, however, the HDMI cable is present (as in FIGS. 4A-4C), the node voltage rises slowly to 1.8V as indicated by the solid line in the node plot. The count of the counter 73 (indicated by X's) is thus significantly higher and this produces a cable detection signal.

It is noted that, in the embodiment 46B, the resistor 65 provides a charging current to the capacitor 64 and the comparator 62 is coupled to sense a predetermined time for voltage across the capacitor to rise to a predetermined level after the capacitor has been discharged. The predetermined time indicates presence of the HDMI cable.

Figure 8B:
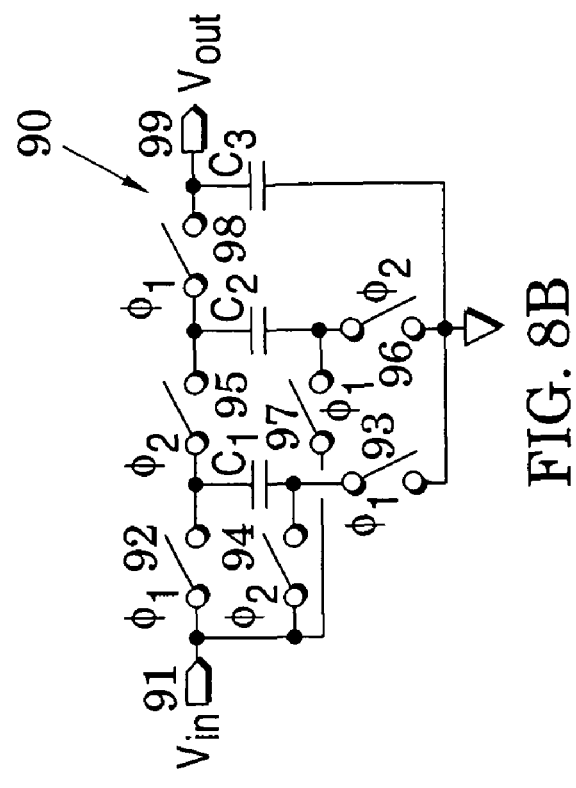
FIGS. 8A and 8B are schematics of charge pump embodiments for use in the system of FIG. 6.
Figure 8A:
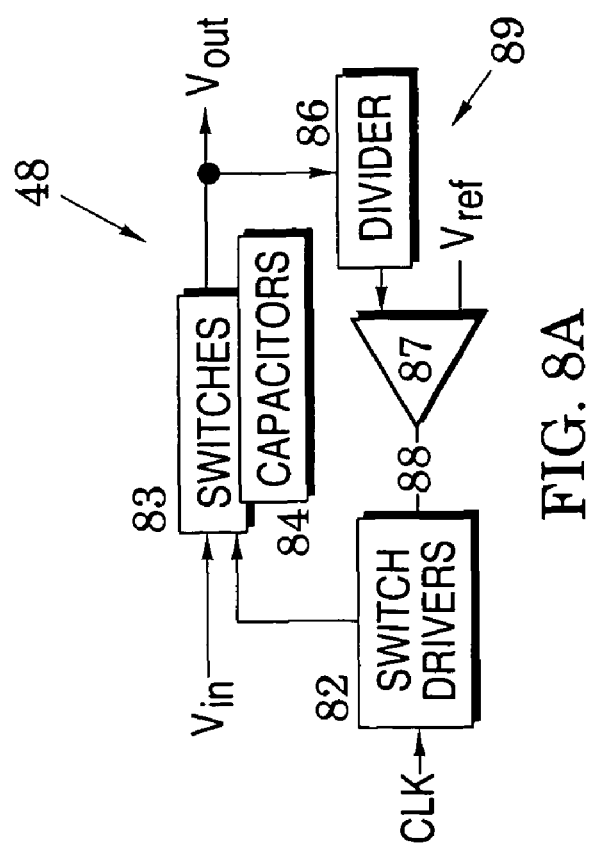

FIG. 8A illustrates an embodiment of the charge pump 48 of FIG. 6. In this embodiment, charge pump drivers 82 are clocked to drive charge pump switches 83 which interconnect capacitors 84 in switch modes to thereby generate a desired output voltage $V_{out}$ from an available input voltage $V_{in}$. The output voltage (or a reduced version of the output voltage that is realized with divider 86) is compared with a reference voltage $V_{ref}$ in a comparator 87 to generate a feedback correction signal 88 that controls (i.e., activates) the switch drivers in a feedback loop 89. In different pump modes, the charge pump injects charges through first plates of capacitors and then applies voltages to second plates of these capacitors to thereby generate an output voltage $V_{out}$ that is greater than the input voltage $V_{in}$.

FIG. 8B illustrates an arrangement embodiment 90 of the switches and capacitors of FIG. 8A. Attention is initially directed to a capacitor $C_1$ and associated switches 92, 93 and 94. When switches 92 and 93 close in a first operational phase φ1, capacitor $C_1$ is charged to the input voltage $V_{in}$ at input port 91. When switch 94 closes in a subsequent second operational phase φ2, the input voltage $V_{in}$ is applied to the bottom plate of capacitor $C_1$ so that this capacitor's top plate is elevated to $2V_{in}$. In alternating operational phases, capacitor $C_1$ is thus continuously pumped to establish the input voltage $V_{in}$ at its top plate at the beginning of each second operational phase φ2.

In each second operational phase φ2, switches 95 and 96 couple the top plate of capacitor $C_2$ to the top plate of capacitor $C_1$ so that a voltage $2V_{in}$ is applied to the top plate of capacitor $C_2$ at the beginning of this phase. Charges are thus transferred from capacitor $C_1$ to capacitor $C_2$ during the remainder of the second operational phase φ2. In alternating operational phases, capacitor $C_2$ is thus continuously pumped to establish the voltage $2V_{in}$ across it.

In each first operational phase φ1, switches 97 and 98 then couple the top plate of capacitor $C_2$ to the top plate of output capacitor $C_3$ while applying the input voltage $V_{in}$ to the bottom plate of output capacitor $C_3$. This final operation continuously pumps the output capacitor $C_3$ to establish an output voltage at the output port 99 that substantially equals $3V_{in}$. The output voltage $V_{out}$ is thus pumped above the input voltage $V_{in}$.

In another charge pump embodiment, the switch 94 may be eliminated. Now, in each second operational phase φ2, switches 95 and 96 couple the top plate of capacitor $C_2$ to the top plate of capacitor $C_1$ so that a voltage $V_{in}$ is established at the top plate of capacitor $C_2$. In each first operational phase φ1, switches 97 and 98 then couple the top plate of capacitor $C_2$ to the top plate of output capacitor $C_3$ while applying the input voltage $V_{in}$ to the bottom plate of output capacitor $C_3$. This final operation continuously pumps the output capacitor $C_3$ to establish an output voltage at the output port 99 that substantially equals $2V_{in}$.

Activation system embodiments have been disclosed to initiate HDMI communication between an HDMI source and an HDMI sink through an HDMI receptacle of the source. These systems and methods are especially suited for use with mobile sources that generally operate from a battery that cannot provide the +5V signal which the HDMI protocol requires sources to place on the +5V pin of their HDMI receptacles. These activation embodiments automatically detect the insertion of an HDMI cable into the source's HDMI receptacle and will subsequently generate and apply the required +5V signal to the +5V pin of the source's HDMI receptacle to initiate HDMI communication. Because they are directed to use in mobile sources, the embodiments are configured to minimize current drain.

The embodiments of the invention described herein are exemplary and numerous modifications, variations and rearrangements can be readily envisioned to achieve substantially equivalent results, all of which are intended to be embraced within the spirit and scope of the appended claims.

We claim:

1. A high-definition multimedia interface (HDMI) activation system to facilitate communication between an HDMI source and an HDMI sink through an HDMI receptacle of said source, the system comprising:
    a capacitance detector coupled to at least one predetermined pin of said HDMI receptacle to enable detection of a capacitance increase when an HDMI cable is inserted into said receptacle; and
    a charge pump configured to apply an activation voltage to a +5V pin of said receptacle in response to said detection;
    whereby said communication is initiated;
    wherein said capacitance detector includes:
    a capacitor;
    a resistor coupled to provide a charging current to said capacitor; and
    a comparator coupled to sense a predetermined voltage drop across said capacitor when said predetermined pin is coupled to said capacitor after said capacitor has been charged; and
    further including a flip-flop to provide said detection in response to said comparator;
    wherein said predetermined voltage drop indicates presence of said cable.

2. The system of claim 1, wherein said predetermined pin is a hot plug detect (HPD) pin.

3. The system of claim 1, further including a voltage monitor coupled to a hot plug detect (HPD) pin of said receptacle to detect receipt of a high voltage level from said sink in response to said activation voltage.

4. The system of claim 3, wherein said voltage monitor is coupled to reactivate said capacitance detector and deactivate said charge pump in response to an absence of said high voltage level.

5. The system of claim 3, wherein said activation voltage is between 4.8 and 5.3 volts and said high voltage level is between 2.4 and 5.3 volts.

6. The system of claim 1, wherein said charge pump includes:
    a capacitor; and
    a switch system arranged to couple a voltage to a first plate of said capacitor in a first operational phase and to couple said voltage to a second plate of said capacitor in a second operational phase;
    said first plate thereby pumped above said voltage.

7. The system of claim 6, wherein said charge pump includes a second capacitor and said switch system is arranged to couple the first plate of said capacitor to a first plate of said second capacitor in said second operational phase and to couple said voltage to a second plate of said second capacitor in said first operational phase.

8. The system of claim 6, wherein said source is a cell phone and said sink is a television monitor.

9. A high-definition multimedia interface (HDMI) activation system to facilitate communication between an HDMI source and an HDMI sink through an HDMI receptacle of said source, the system comprising:
    a capacitance detector coupled to at least one predetermined pin of said HDMI receptacle to enable detection of a capacitance increase when an HDMI cable is inserted into said receptacle; and
    a charge pump configured to apply an activation voltage to a +5V pin of said receptacle in response to said detection;
    whereby said communication is initiated;
    wherein said capacitance detector includes:

a capacitor;
a resistor coupled to provide a charging current to said capacitor; and
a comparator coupled to sense a predetermined time for voltage across said capacitor to rise to a predetermined level after said capacitor has been discharged; and
further including a counter to provide said detection in response to said comparator;
wherein said predetermined time indicates presence of said cable.

10. A high-definition multimedia interface (HDMI) activation system to facilitate communication between an HDMI source and an HDMI sink through an HDMI receptacle of said source, the system comprising:
a capacitance detector coupled to a hot plug detect (HPD) pin of said HDMI receptacle to enable detection of a capacitance increase when an HDMI cable is inserted into said receptacle;
a charge pump configured to apply an activation voltage to a +5V pin of said receptacle in response to said detection; and
a voltage monitor coupled to a said HPD pin to detect receipt of a high voltage level from said sink in response to said activation voltage;
said communication thereby initiated;
wherein said capacitance detector includes:
a capacitor;
a resistor coupled to provide a charging current to said capacitor; and
a comparator coupled to sense a predetermined voltage drop across said capacitor when said predetermined pin is coupled to said capacitor after said capacitor has been charged; and
further including a flip-flop to provide said detection in response to said comparator;
wherein said predetermined voltage drop indicates presence of said cable.

11. The system of claim 10, wherein said voltage monitor is coupled to reactivate said capacitance detector and deactivate said charge pump in response to an absence of said high voltage level.

12. The system of claim 11, wherein said activation voltage is between 4.8 and 5.3 volts and said high voltage level is between 2.4 and 5.3 volts.

13. The system of claim 10, wherein said charge pump includes:
a capacitor; and
a switch system arranged to couple a voltage to a first plate of said capacitor in a first operational phase and to couple said voltage to a second plate of said capacitor in a second operational phase;
said first plate thereby pumped above said voltage.

14. A high-definition multimedia interface (HDMI) activation system to facilitate communication between an HDMI source and an HDMI sink through an HDMI receptacle of said source, the system comprising:
a capacitance detector coupled to a hot plug detect (HPD) pin of said HDMI receptacle to enable detection of a capacitance increase when an HDMI cable is inserted into said receptacle;
a charge pump configured to apply an activation voltage to a +5V pin of said receptacle in response to said detection; and
a voltage monitor coupled to a said HPD pin to detect receipt of a high voltage level from said sink in response to said activation voltage;
said communication thereby initiated;
wherein said capacitance detector includes:
a capacitor;
a resistor coupled to provide a charging current to said capacitor; and
a comparator coupled to sense a predetermined time for voltage across said capacitor to rise to a predetermined level after said capacitor has been discharged; and
further including a counter to provide said detection in response to said comparator;
wherein said predetermined time indicates presence of said cable.

* * * * *